(12) United States Patent
Liddiard

(10) Patent No.: US 9,770,943 B2
(45) Date of Patent: Sep. 26, 2017

(54) OMNIDIRECTIONAL WHEEL

(71) Applicant: William Liddiard, London (CA)

(72) Inventor: William Liddiard, London (CA)

(73) Assignee: William Liddiard, London, Ontario (CA)

( * ) Notice: Subject to any disclaimer, the term of this patent is extended or adjusted under 35 U.S.C. 154(b) by 17 days.

(21) Appl. No.: 14/392,090

(22) PCT Filed: Mar. 17, 2014

(86) PCT No.: PCT/CA2014/000078
§ 371 (c)(1),
(2) Date: Sep. 28, 2015

(87) PCT Pub. No.: WO2014/165962
PCT Pub. Date: Oct. 16, 2014

(65) Prior Publication Data
US 2016/0023511 A1  Jan. 28, 2016

(30) Foreign Application Priority Data
Apr. 9, 2013 (CA) ...................................... 2813399

(51) Int. Cl.
*B60B 19/00* (2006.01)
*B60C 3/02* (2006.01)
*B60K 7/00* (2006.01)
*B60B 19/12* (2006.01)

(52) U.S. Cl.
CPC .............. *B60B 19/003* (2013.01); *B60C 3/02* (2013.01); *B60K 7/00* (2013.01); *B60B 19/12* (2013.01)

(58) Field of Classification Search
CPC ............ B60B 19/003; B60C 3/02; B60K 7/00
USPC .......................... 301/5.1, 5.23; 180/7.1, 7.2
See application file for complete search history.

(56) References Cited

U.S. PATENT DOCUMENTS

| 7,878,284 | B1* | 2/2011 | Shultz | B60C 7/22 180/10 |
| 2011/0115279 | A1* | 5/2011 | Gomi | B60B 19/003 301/5.23 |
| 2012/0019048 | A1* | 1/2012 | Mckinnon | B60B 19/12 301/5.23 |
| 2012/0181846 | A1* | 7/2012 | Liddiard | B60B 19/12 301/5.23 |
| 2014/0232174 | A1* | 8/2014 | Zdrahal | B60B 11/02 301/5.23 |
| 2015/0151572 | A1* | 6/2015 | Parrott | B60B 19/12 301/5.23 |

* cited by examiner

*Primary Examiner* — S. Joseph Morano
*Assistant Examiner* — Jean Charleston

(57) ABSTRACT

An omnidirectional wheel including a rim with at least one plate member and a means of attaching the wheel to a vehicle; a plurality of rollers comprising at least two toroidal rows of rollers disposed around the rim for mounting a tire; and a means of actuating the tire around its axis, defined, for example, by the never-ending torus axial member of the tire, whereby, when the wheel is engaging the ground, the tire rolling on the rim causes a side movement of the wheel, parallel to the wheel axis, in a plan orthogonal to the normal plan of rotation of the wheel when attached to the vehicle. A tire having a never-ending torus axial member, a helical bearing member, and a resilient toroidal shape is also provided.

15 Claims, 5 Drawing Sheets

OMNIDIRECTIONAL WHEEL

FIELD OF THE INVENTION

The invention relates to the structure and operation of wheels. In particular, the invention relates to an omnidirectional wheel for controlled motion of a vehicle in any direction.

BACKGROUND OF THE INVENTION

There have been various developments within the prior art, where attempts have been made, to provide wheels capable of providing controlled motion of a vehicle in any direction. For example, U.S. Pat. No. 7,641,288 issued Jan. 5, 2010 (Baker et al.) discloses an omnidirectional wheel that when mounted on the four corners of a frame and independently driven allow for omnidirectional movement of the mounting frame. The omnidirectional wheel design allows the use of two identical stampings or molded bases with key holes and locating posts diametrically opposed, assembled back to back with elastomeric or rubber outer rollers mounted in between at an angle to the axis of rotation.

U.S. Pat. No. 6,547,340 issued Apr. 15, 2003 (Harris) discloses an omnidirectional wheel for an omnidirectional vehicle that exhibits constant ride height, low vibration, and reduced maximum ground contact pressure. The omnidirectional wheel consists of a wheel assembly rotatably connected to the omnidirectional vehicle chassis. The wheel assembly includes a hub on which free spinning rollers are rotatably mounted at an angle to the wheel axis. Another patent issued to Harris is U.S. Pat. No. 6,796,618 disclosing a method for designing an omnidirectional wheel.

U.S. Patent No. 2002/0153205, published Oct. 24, 2002 (Zinanti) discloses an omnidirectional wheel having a frictional bias which favors a forward and backward motion over a side-to-side motion. The omnidirectional wheel includes a frame having an upper portion for affixing the frame to an under-side of a weight bearing surface, at least two walls, and a central cavity defined between the side walls for receiving at least one spherical wheel, and at least two wheel bearings connected in axial alignment to the side walls for rotation of the wheel about a fixed axis.

U.S. Pat. No. 4,223,753, issued Sep. 23, 1980 (Bradbury) discloses an apparatus for producing or measuring omnidirectional motion of the apparatus upon a relatively smooth but not necessarily planar surface and/or for producing or measuring omnidirectional movement of the surface relative to the apparatus. The transport device includes a frame and at least two wheels having peripheral rollers, the wheels rotating about non-parallel axes. Any desired movement of the device relative to a given surface can be achieved be appropriate rotational inputs to the wheels.

U.S. patent application Ser. No. 13/261,181 published Jul. 19, 2012 (Liddiard) discloses an omnidirectional wheel having a rim for mounting a tire, a hub for rotatably attaching the wheel to a vehicle, and a means for connecting the rim and hub. The rim of the wheel has a part which is rotatably connected to the hub and which, when radially rotating around the hub, engages the surface of the tire mounted on the rim for rolling the tire on the rim. A tire for use with the omnidirectional wheel is also disclosed.

There are known issues surrounding the prior art designs of omnidirectional wheels. In particular, the prior art wheel designs which rely on many small wheels or rollers arranged in a substantially circular structure forming a larger wheel are known to have limited transit speeds due to uneven ride and vibrations, especially under heavy load. Further, the use of such wheels may be severely limited on certain surfaces and under adverse weather conditions by virtue of an uneven contact with the surface.

Moreover, the designs involving angles and many small wheels appear overly complex and consist of many parts which may be prone to mechanical failure or require heavy maintenance. Additionally, such wheels appear to have restrictive loads due to many connecting joints and frictional bias. Accordingly, it may be desirable to provide an omnidirectional wheel which is simple in design and is adequate and ready for use in a vast range of vehicles without significant changes to the existing chassis or drive mechanism of the vehicle.

SUMMARY OF THE INVENTION

It is, thus, an object of the invention to provide an omnidirectional wheel which addresses the deficiencies found within the prior art.

The invention overcomes the aforementioned deficiencies by nature of its design and operation.

According to an embodiment of the invention there is provided, an omnidirectional wheel including a rim, for attaching the wheel to a vehicle, comprising at least one plate member; a plurality of rollers, comprising at least two toroidal rows of rollers disposed around an outer circumference of the rim, the rows being arranged in a mutually opposing relationship and being connected to the rim for mounting a tire, securely guiding the tire, and to prevent the tire from slipping off the rim, the rollers having a perpendicular axis of rotation with respect to the axis of rotation of the wheel when attached to the vehicle, and which, when rotating on the rim, engages the tire mounted on the rollers for rotating the tire on the rim about the circumferential axis of the tire, defined, for example, by the never-ending torus axial member of the tire, whereby, when the wheel is engaging the ground, the tire rolling or rotating on the rim about the axis of the tire causes a sideways movement of the wheel, parallel to the wheel axis, in a plan substantially orthogonal to the normal plan of rotation of the wheel when attached to the vehicle.

According to an embodiment of the invention, at least one roller can have a textured surface, for example, horizontal, vertical, radial, circular, or spiral recesses, or combinations thereof.

According to an embodiment of the invention, there is provided, a means of actuating at least one roller of the rim for rotating the tire on the rim about the circumferential axis of the tire, for example, a motor.

According to another embodiment of the Invention, there is provided, a gear mechanism for transferring rotational motion from the actuating means to the driven roller, for example, a spur gear mechanism, a planetary gear mechanism or a worm gear mechanism, in particular, wherein, the actuating means and gear mechanism comprise a parallel shaft gear motor, a planetary gear motor, or a worm gear motor.

According to an embodiment of the invention, there is provided, an exemplary tire, for use with the omnidirectional wheel. The tire comprising a never-ending torus axial member, for example, a continuous ring machined from one piece of seamless material; a helical bearing member, for example, a self-lubricating helical plain bearing and a resilient toroidal shape exterior attached thereto.

BRIEF DESCRIPTION OF THE DRAWINGS

The invention will be further understood from the following detailed description of preferred embodiments of the invention in conjunction with the accompanying drawings, in which.

NUMERICAL REFERENCE

Figure 1:
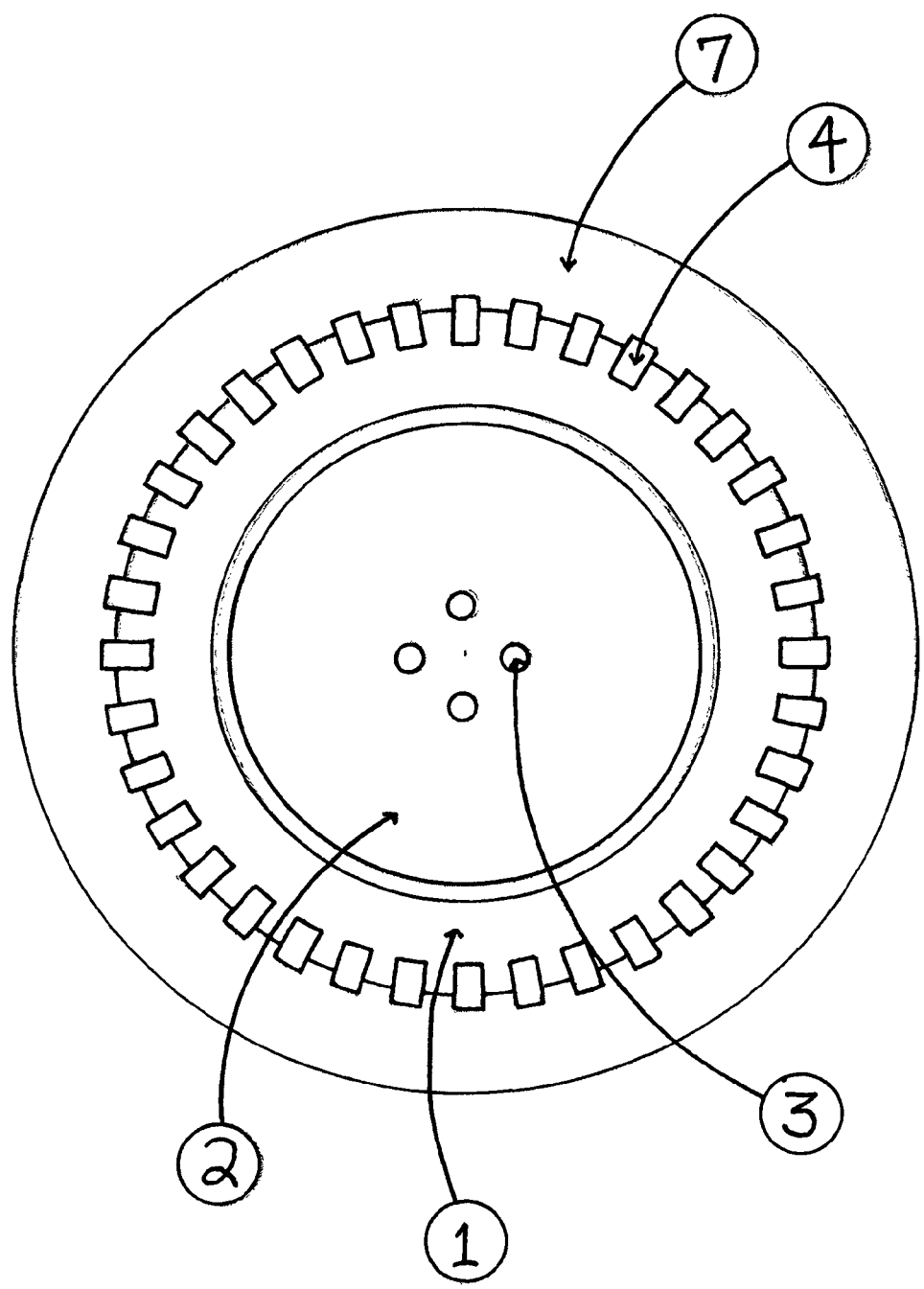
FIG. 1 is a perspective view of the wheel according to an embodiment of the Invention.

1. Rim plate member
2. Rim hub member
3. Wheel mount hole
4. Free spin roller
5. Driven roller
6. Motor
7. Tire
8. Never-ending torus axial member
9. Helical bearing member

DETAILED DESCRIPTION OF THE INVENTION

A better understanding of the invention and its objects and advantages will become apparent to those skilled in the art from the following detailed description, wherein there are described embodiments of the invention, simply by way of Illustration of modes contemplated for carrying out the invention. As will be realized, the Invention is capable of modifications in various obvious respects, all without departing from the scope and essence of the invention. Accordingly, the description should be regarded as illustrative in nature and not as restrictive in any way.

Referring to FIG. 1, shown is a perspective view of the omnidirectional wheel according to an embodiment of the invention, comprising rim plate member 1, rim hub member 2, free spin rollers 4, and tire 7. A means of mounting the wheel to the vehicle can be provided, for example, by a plurality of wheel mount holes 3.

Figure 2:
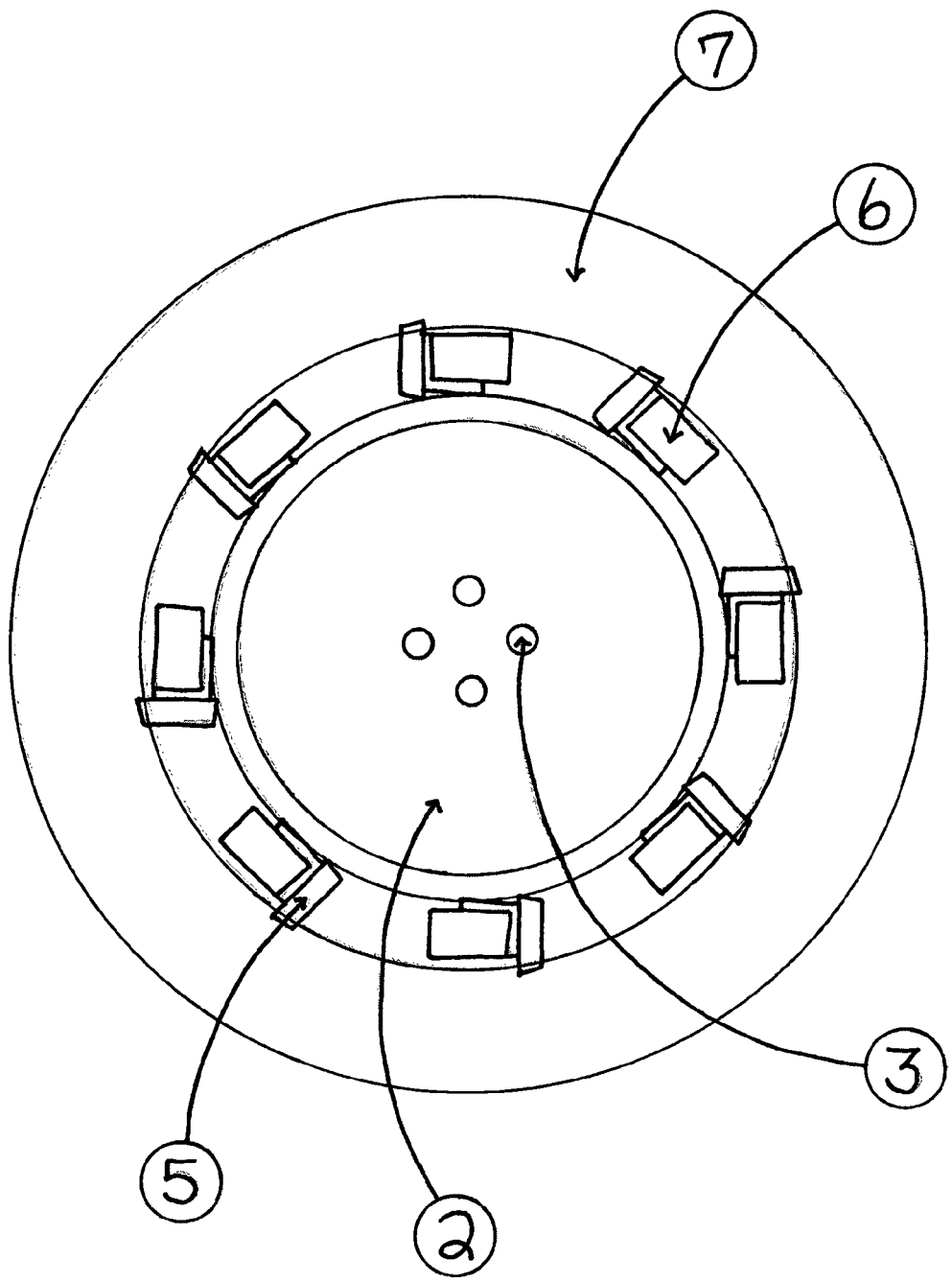
FIG. 2 is a perspective view of FIG. 1, illustrating in isolation a means of rotating the tire around its axis, defined, by the never-ending torus axial member of the tire.

Referring to FIG. 2, shown Is a perspective view of the embodiment of the invention according to FIG. 1, illustrating in isolation, rim hub member 2, motors 6, driven rollers 5, and tire 7.

Figure 3:
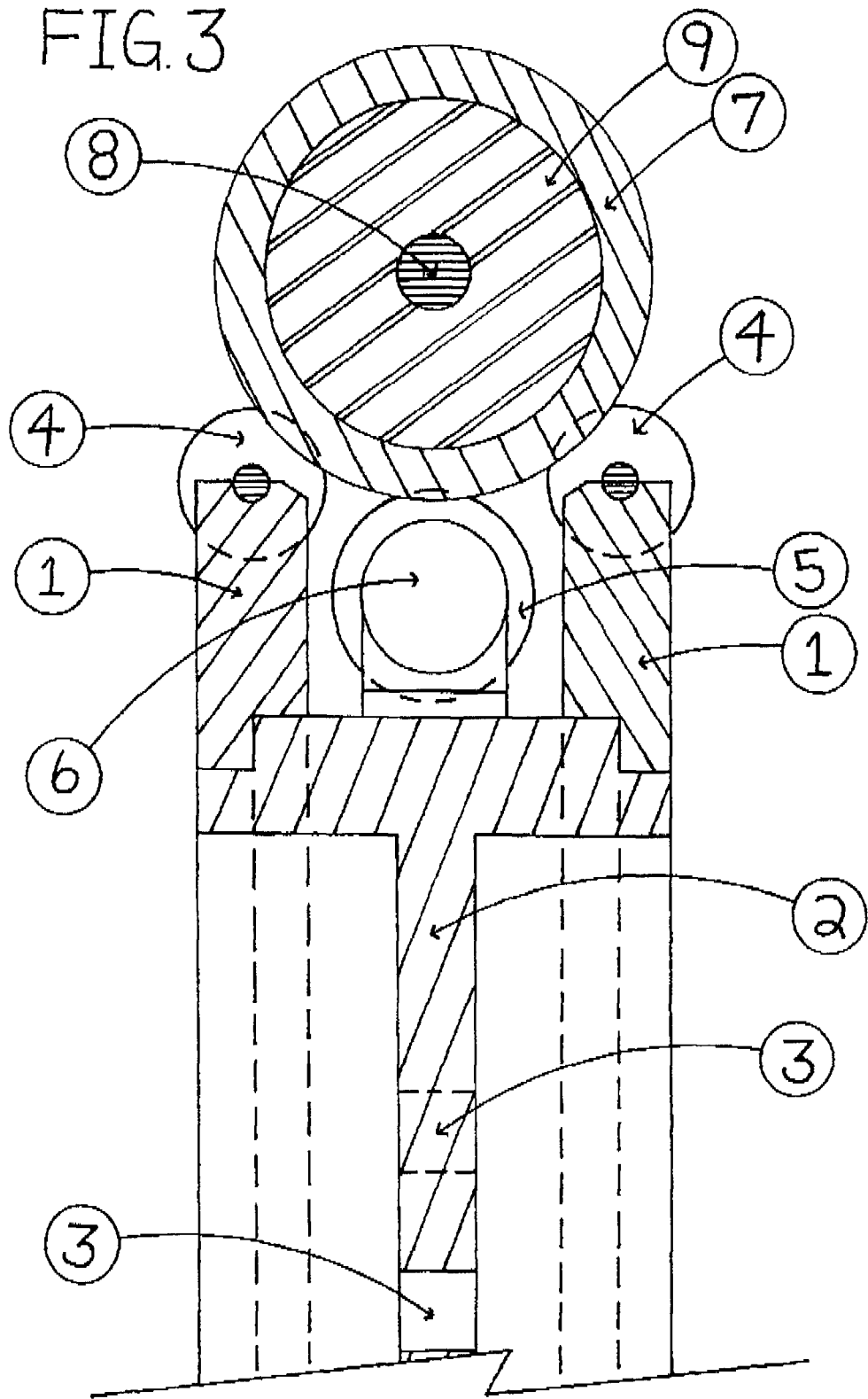
FIG. 3 is a cross-sectional view of the wheel of FIG. 1.

Referring to FIG. 3, shown is a cross-sectional view of the wheel assembly of FIG. 1, comprising rim plate members 1, rim hub member 2, free spin rollers 4, driven roller 5, motor 6, and tire 7. According to the embodiment of the invention, there can be provided at least one motor 6 for rotating at least one driven roller 5, thus, effecting the side rotation of the tire 7 around its axis, on free spin rollers 4 connected to rim plate members 1, causing the ground engaging wheel to move sideways, parallel to the wheel axis, in a plan orthogonal to the normal plan of rotation of the wheel when attached to the vehicle. Rotation of the tire 7 around its axis, can be reversed by reversing the rotation of the actuating means of the driven roller 5.

Figure 4:
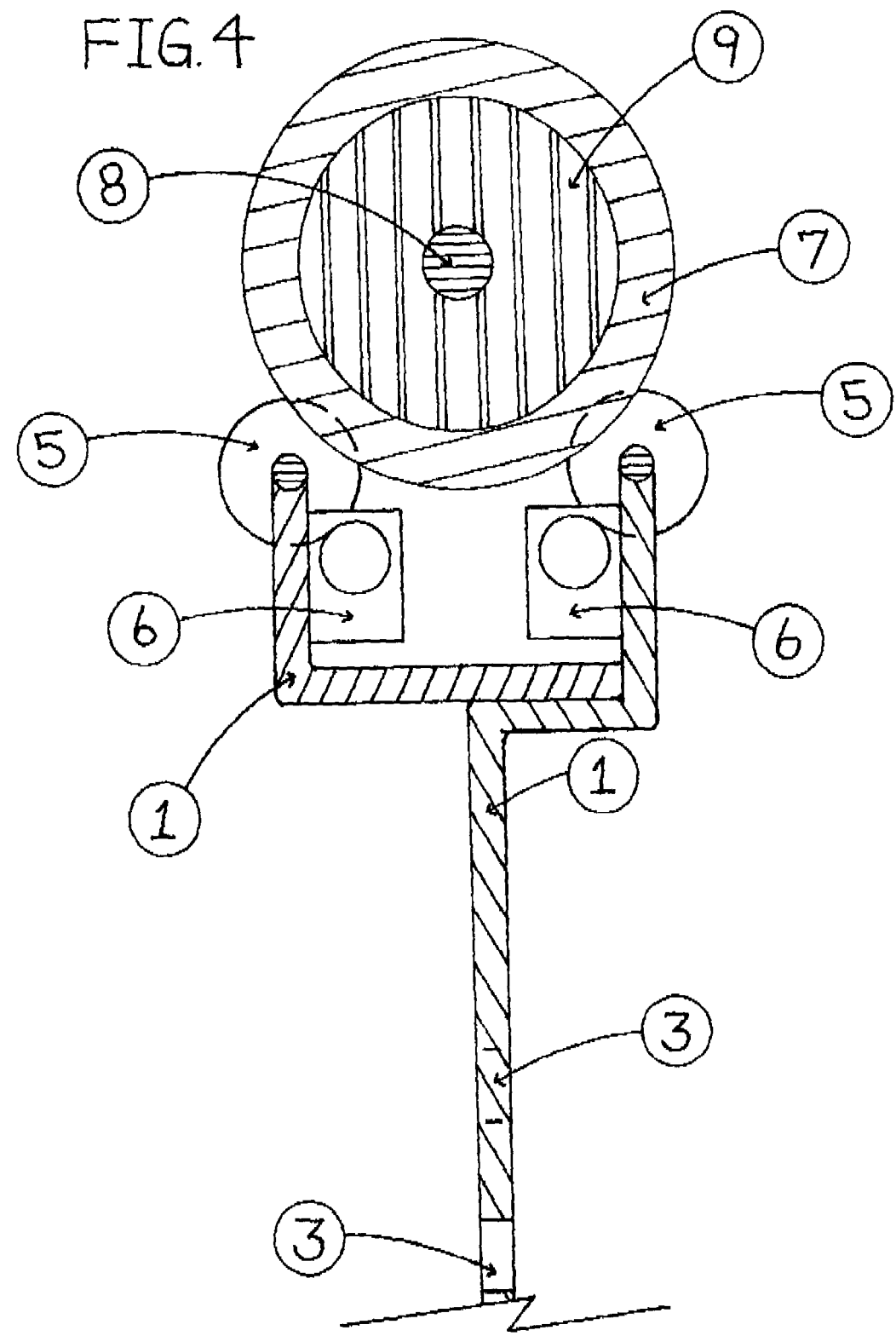
FIG. 4 is a cross-sectional view of the wheel according to another embodiment of the invention.

Referring to FIG. 4, shown is a cross-sectional view of the omnidirectional wheel according to another embodiment of the invention, comprising rim plate members 1, driven rollers 5, motors 6, and tire 7. According to the embodiment of the invention, for example, wheel mount holes 3 of the rim plate member 1. According to another embodiment of the invention, there can be provided, at least one roller with a textured surface, for example, horizontal, vertical, radial, circular, or spiral recesses, or combinations thereof, as a means of fixing the tire 7 against accidentally sliding around the wheel, about the axis of the wheel when attached to the vehicle.

Figure 5:
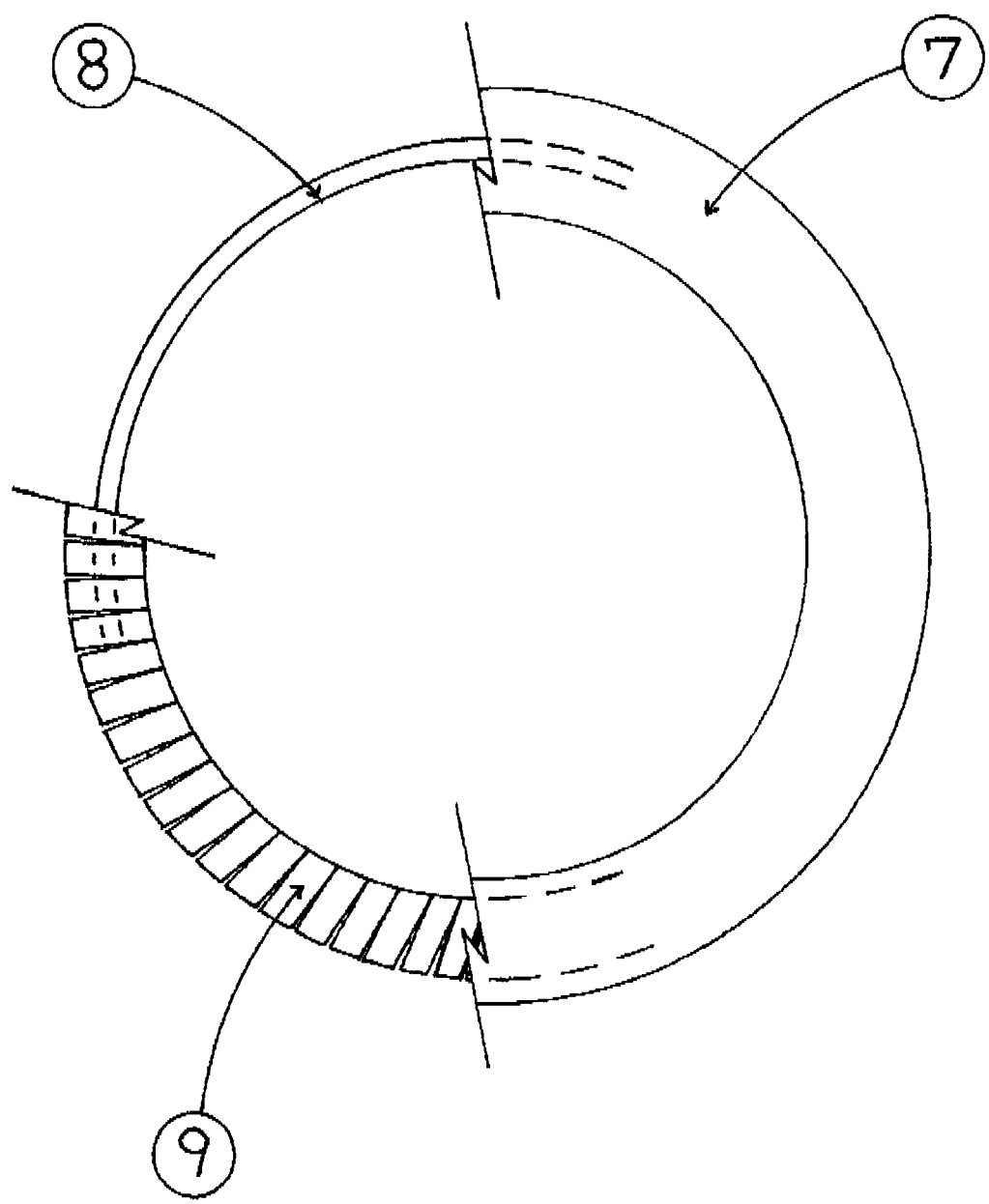
FIG. 5 is a sectional view of the tire according to an embodiment of the invention.

Referring to FIG. 5, shown is a sectional view of the tire 7 according to the embodiment of the invention, comprising never-ending torus axial member 8, for example, a continuous ring machined from one piece of seamless material; helical bearing member 9, for example, a self-lubricating helical plain bearing; and toroidal shape exterior, for example, a tubular layer of pure gum rubber attached thereto.

Any suitable material can be employed for the construction of the wheel and tire, such as, for example, resilient, self-lubricating, composite, plastic, metallic, er combinations thereof, according to the intended application by a person of ordinary skill in the art of the invention.

Modifications, variations, and adaptation of the embodiments of the present invention described above are possible with the scope of the invention which is defined by the claims appended hereto.

INDUSTRIAL APPLICABILITY

The invention provides an omnidirectional wheel. The benefits derived from the use of the invention can be enjoyed, for example, in the construction of vehicle capable of controlled motion in any direction, in connection with, for example, military, industrial, medical, and recreational applications.

The embodiments of the invention in which an exclusive property or privilege is claimed are defined as follows:

1. An omnidirectional wheel, comprising:
   a) a rim, having at least one plate member, and a means for attaching the rim to a vehicle;
   b) a tire, having a toroidal shape, the tire further having a circumferential axis, and
   c) a plurality of rollers, comprising at least two toroidal rows of rollers disposed around an outer circumference of the rim, the at least two toroidal rows of rollers being arranged in a mutually opposing relationship and being connected to the rim for mounting the a tire, the at least two toroidal rows of rollers having a perpendicular axis of rotation with respect to the axis of rotation of the omnidirectional wheel when attached to the vehicle, and which, when rotating on the rim, the at least two toroidal rows of rollers engage the tire mounted on the rollers for rotating the tire on the rim about the circumferential axis of the tire; and
   whereby, when the wheel is engaging the ground, the tire rotating on the rim about the circumferential axis of the tire causes a sideways movement of the wheel, in a plane substantially orthogonal to the normal plane of rotation of the rim when the wheel is mounted to the rim and the rim is attached to the vehicle.

2. The omnidirectional wheel, according to claim 1, further comprising: a rim hub member.

3. The omnidirectional wheel, according to claim 1, further comprising: free spin rollers.

4. The omnidirectional wheel according to claim 1, further comprising: at least one driven roller.

5. The omnidirectional wheel, according to claim 4, further comprising: an actuating means for rotating at least one driven roller.

6. The omnidirectional wheel, according to claim 5, further comprising: a gear mechanism for transferring rotational motion from the actuating means to the driven roller.

7. The omnidirectional wheel, according to claim 6, wherein: the gear mechanism for transferring rotational motion from the actuating means to the driven roller is a spur gear mechanism.

8. The omnidirectional wheel, according to claim 5, wherein: the actuating means for rotating at least one driven roller is a parallel shaft gear motor, a planetary gear motor, or a worm gear motor.

9. The omnidirectional wheel, according to claim 6, wherein: the gear mechanism for transferring rotational motion from the actuating means to the driven roller is a planetary gear mechanism.

10. The omnidirectional wheel, according to claim 6, wherein: the gear mechanism for transferring rotational motion from the actuating means to the driven roller is a worm gear mechanism.

11. The omnidirectional wheel, according to claim 6, further comprising: the actuating means for rotating at least one driven roller is a motor connected to the gear mechanism.

12. The omnidirectional wheel, according to claim 1, further comprising: at least one roller with a textured surface; and in particular wherein the textured surface is horizontal, vertical, radial, circular, or spiral recesses or combinations thereof.

13. The omnidirectional wheel, according to claim 1, further comprising: the tire for use with the omnidirectional wheel having a never-ending torus axial member.

14. The omnidirectional wheel, according to claim 1, further comprising: the tire for use with the omnidirectional wheel having a helical bearing member.

15. The omnidirectional wheel, according to claim 1, further comprising: the tire for use with the omnidirectional wheel having a tubular layer of pure gum rubber attached thereto.

* * * * *